TELEVISION RECEIVER CIRCUIT

Filed May 24, 1954 7 Sheets-Sheet 1

INVENTORS.
RICHARD A. MAHER.
CHRISTIAN C. PFITZER.
BY Alden D. Redfield
Norman J. O'Malley
ATTORNEYS.

INVENTORS.
RICHARD A. MAHER.
CHRISTIAN C. PFITZER.
BY Alden D. Redfield
Norman J. O'Malley
ATTORNEYS.

May 15, 1956 R. A. MAHER ET AL 2,745,899

TELEVISION RECEIVER CIRCUIT

Filed May 24, 1954 7 Sheets-Sheet 3

INVENTORS.
RICHARD A. MAHER.
CHRISTIAN C. PFITZER.
BY Alden D. Redfield
Norman J. O'Malley
ATTORNEYS.

INVENTORS.
RICHARD A. MAHER.
CHRISTIAN C. PFITZER.
BY Alden D. Redfield
Norman J. O'Malley
ATTORNEYS.

INVENTORS.
RICHARD A. MAHER.
CHRISTIAN C. PFITZER.
BY Alden D. Redfield
Norman J. O'Malley
ATTORNEYS.

May 15, 1956 R. A. MAHER ET AL 2,745,899

TELEVISION RECEIVER CIRCUIT

Filed May 24, 1954 7 Sheets-Sheet 6

INVENTORS.
RICHARD A. MAHER.
BY CHRISTIAN C. PFITZER.
Alden D. Redfield
Norman J. O'Malley.
ATTORNEYS.

INVENTORS.
RICHARD A. MAHER.
CHRISTIAN C. PFITZER.
BY Alden D. Redfield
Norman J. O'Malley
ATTORNEYS.

United States Patent Office 2,745,899

Patented May 15, 1956

2,745,899

TELEVISION RECEIVER CIRCUIT

Richard A. Maher, Cincinnati, and Christian C. Pfitzer, Deer Park, Ohio, assignors to Avco Manufacturing Corporation, Cincinnati, Ohio, a corporation of Delaware Application May 24, 1954, Serial No. 431,814

6 Claims. (Cl. 178—5.4)

Figure 1:
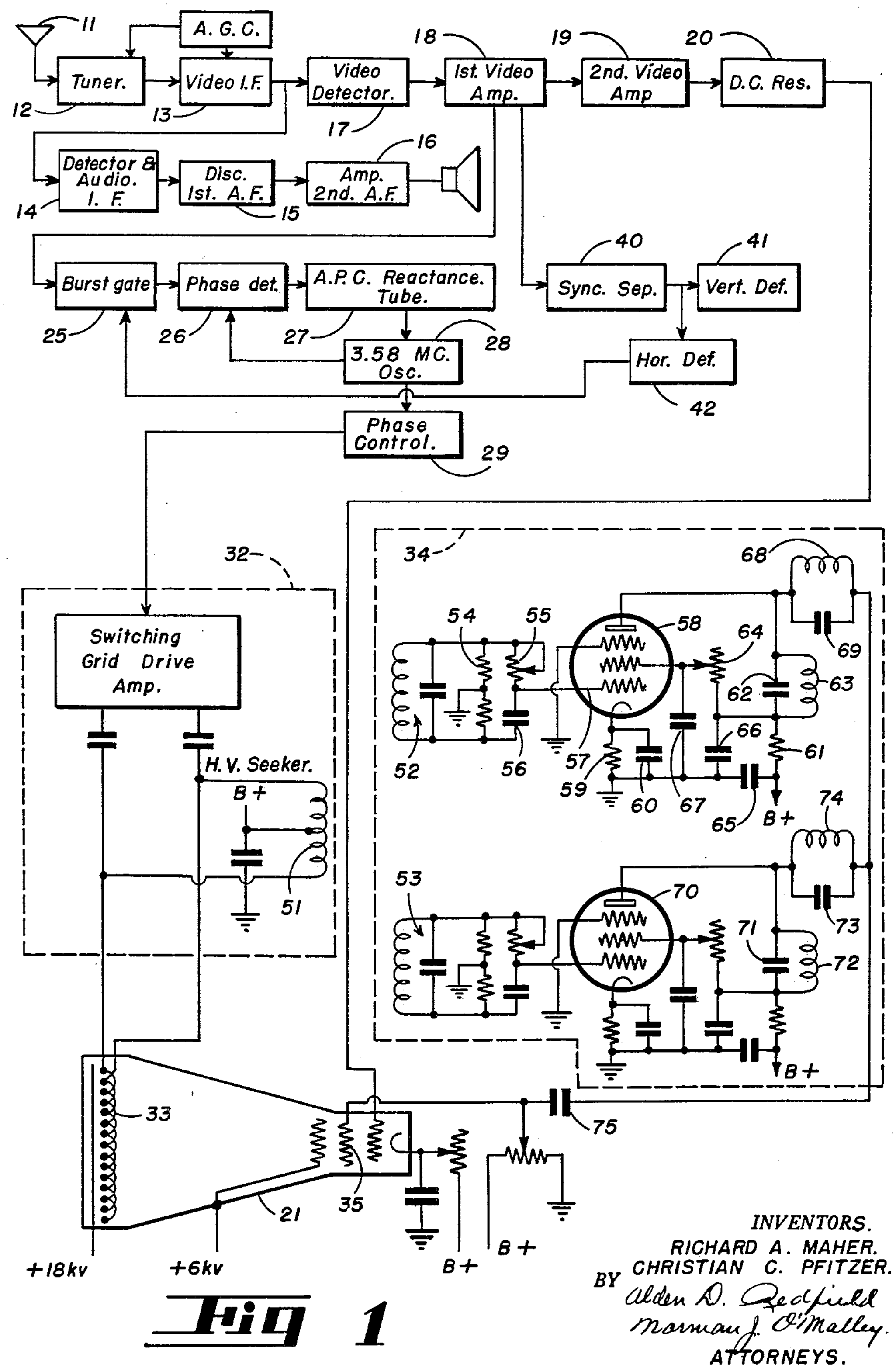

This invention relates generally to color television receiver circuitry and specifically to color television receiver circuitry suitable for decoding signals and displaying images encoded and transmitted in accordance with standards of the Federal Communications Commission.

*The standard signal*

It has long been known that the components of a mixture of colored lights cannot be resolved by the eye and that colors can be matched by an additive mixture of three colored lights or primaries. Any three colors can serve as primary colors suitable for producing a gamut of other colors, providing no one of the colors used can be matched by additive mixtures of the other two. The range of colors which may be produced or matched in this manner is governed by the particular primaries selected for mixture, i. e., a given set of primaries can produce only a given gamut of colors by additive mixture while a second set of primary colors of higher saturation than the first set will reproduce a wider gamut of color.

Any signal designed to translate object colors for reproduction into image colors must vary so as to define the object in terms of three basic attributes of the color sensation, viz., hue, saturation and luminance or brightness. Thus, the object color is described as having a given hue, indicating the redness, yellowness, blueness, etc. Second, the object color is described in terms of saturation or the inverse measure of the dilution of the hue by white light. For example, if a color of a given hue contains little, if any, white, it is described as being highly saturated. Conversely, if a color of a given hue contains considerable white, it is described as being of low saturation. In addition, object colors are described as having a degree of brightness or luminance, i. e., the degrees of lightness or darkness exhibited.

Generally, considering the signal as standardized by the Federal Communications Commission on December 17, 1953, for color television transmission in the United States, hereinafter called the standard color television signal, the object is scanned from left to right and from top to bottom in a series of narrow lines in the same manner as in black and white television transmission. Each complete image frame comprises two interlaced scans which may be called the first field scan and the second field scan. The first field scan is made up of 262½ (odd) lines, including the first line and all other odd-numbered lines. The second field scan is made up of the remaining 262½ (even) interlaced lines positioned in gaps left after completion of the first field scan and includes the second line and all of the remaining even lines. Thus, the first and second fields interlace to form a complete frame scan of the object from top to bottom in 525 horizontal lines. These horizontal lines are scanned at a rate of $15{,}734.246 \pm 0.047$ lines or cycles per second, making the field scanning rate approximately 59.94 fields or cycles per second.

The complete color television signal includes synchronizing signals and color picture signals modulated successively on a carrier for transmission. The modulating signal or color picture signal can be defined as an electrical signal representing color picture information which includes both a monochrome component and a carrier chrominance signal modulated with color information. It is the monochrome component of the color picture signal which has major control of the luminance in the reproduced color picture as well as major control of the luminance of the picture produced by conventional monochrome television receivers receiving a complete color television signal.

The carrier chrominance signal portion of the color picture signal contains the color information encoded as a simultaneous pair of chrominance components, each containing hue and saturation information, and is added to the monochrome portion of the color picture signal in the form of amplitude-modulated sidebands of a pair of suppressed subcarriers in quadrature, having a common frequency approximately 3.58 mc. above the complete color television signal carrier frequency.

In other words, the chrominance information is transmitted on a two-phase suppressed subcarrier signal. As will be seen, the term "suppressed subcarrier" or "suppressed carrier" does not mean that the subcarrier is completely missing from the transmitted wave form. These terms are words of art intended to describe the wave form of the output of a balanced modulator or a pair of balanced modulators incorporated in the transmitter circuit.

True, from a mathematical viewpoint, the wave form of a suppressed carrier wave with but one modulating signal is a product of the modulating signal and carrier signal that varies with time, and may be expressed as a pair of side band frequencies for each component of the original modulating signal. However, as viewed on an oscilloscope, the modulated suppressed carrier wave form appears, except during modulating signal transition periods, to be a wave of carrier frequency whose amplitude varies in accordance with the modulating signals and whose phase is constant, except for a polarity reversal each time the modulating signal passes through the D. C. axis. When two such signals are combined in quadrature to form a two-phase suppressed subcarrier signal, upon which chrominance information is modulated as a component of the color television signal, the resulting wave form appears, except during color transition periods, to be a wave of carrier frequency whose amplitude varies generally in accordance with the object element saturation and whose phase varies in accordance with the object element hue.

By comparing the chrominance subcarrier frequency with the horizontal scanning frequency, it can be seen that the chrominance subcarrier frequency is selected to be 455/2 times the horizontal scanning frequency. This relationship was carefully selected to allow the chrominance information to be interleaved between the luminance information in such manner as to substantially avoid mutual interference. In other words, the luminance information which is modulated directly on the video carrier has been found to cluster around harmonics of the frame and line scanning frequency, inherently leaving gaps containing little or no information, depending upon the rate of object change, and by selecting the chrominance subcarrier frequency as an odd multiple of one-half of the horizontal scanning rate, these spectrum gaps are utilized and the chrominance information is interleaved with the luminance information in a highly efficient manner.

This method of interleaving frequencies has a further advantage in that the chrominance subcarrier signals produced in any given line during one frame scan are 180 degrees out of phase with the chrominance subcarrier signals produced in the same line during the next frame scan. Thus, a cancellation effect is produced, and when the picture signal is resolved in a television receiver which allows these signals to modulate the electron beam of the display device, e. g., a black and white television receiver, the persistence of vision substantially averages out any effect of the chrominance subcarrier signal after two frame scans.

Since the color picture signal is limited to the same 4.2 mc. bandwidth as the black and white television signal, there is a mere .6 mc. band between the subcarrier frequency and the upper end of the color picture signal passband, and thus full double sideband transmission of the suppressed chrominance subcarrier is not used. Instead, both sidebands of these two signals are transmitted up to a frequency of .6 mc., with the upper sidebands of both signals and the lower sideband of the one signal being strongly attenuated beyond this bandwidth. As a result, little, if any, crosstalk occurs in the .6 mc. band at the output of the demodulator because both sidebands of each signal are present. Beyond this frequency the signal sidebands do introduce filterable crosstalk into the other color channel. Such filtering need not be perfect, since the choice of signal axes is such as to minimize any resultant visual effects on the display screen.

This method of placing color information on the chrominance sub-carrier makes the received instantaneous amplitude of the carrier-chrominance signal approximately proportional to the product of luminance and saturation, and the phase of the carrier-chrominance signal approximately proportional to the dominant wavelength of the object element. Thus, in order to resolve image hue information, it is necessary to establish a chrominance-carrier reference signal or reference against which the instantaneous phase position of the carrier-chrominance signal can be measured. This is done by transmitting color burst signals or short reference bursts of the 3.579545 mc. subcarrier sine wave on the "back porch" of each horizontal synchronizing pulse and by using these color burst signals to synchronize and phase-control a 3.579545 mc. sine wave receiver source.

Equations defining the color picture signal can be written in several forms. Where the color picture signal is equal to the $E_M$ and the monochrome component is equal to $E_Y'$, the signal can be written in the following form:

$$E_M = E_Y' + E_C'$$

where $E_C'$ is the chrominance component. The $E_C'$ or chrominance component may be further subdivided into its two quadrature components, and the color picture signal may then be specified in the following form:

$$E_M = E_Y' + E_Q' \sin(\omega t + 33°) + E_I' \cos(\omega t + 33°) \quad (1)$$

where $$E_Q = 0.41(E_B' - E_Y') + 0.48(E_R' - E_Y') \quad (2)$$

$$E_I' = -0.27(E_B' - E_Y') + 0.74(E_R' - E_Y') \quad (3)$$

$$E_Y' = 0.30E_R' + 0.59E_G' + 0.11E_B' \quad (4)$$

and where $\omega = 2\pi$ times the frequency of the color subcarrier, $E_Q'$ is the quadrature chrominance signal component, $E_I'$ is the inphase chrominance signal component, $E_Y'$ is the monochrome signal, and the voltages $E_G'$, $E_R'$ and $E_B'$ are signals derived from the green, red and blue signal outputs of the camera, with operations such as gamma correction and aperture correction, as shown by the prime designations, performed on the signals before the combinations shown in the above equations are accomplished. These individual voltages may assume values between zero and unity, depending on the hue and intensity of the light from the area under consideration.

As has been stated, the quadrature chrominance signal components are transmitted with double sidebands, carrier suppressed, over a narrow band of approximately .6 mc. If it be assumed that the chrominance portion of the signal is restricted to this narrow bandwidth, i. e., that only a coarse chrominance primary signal is utilized, the equation for this color picture signal becomes:

$$E_M = E_Y' + 0.493(E_B' - E_Y') \sin \omega t + 0.877(E_R' - E_Y') \cos \omega t$$

*Prior art*

The number and type of circuit components used in prior art color television receivers depends, to a considerable extent, upon the type of display device with which the circuit is intended to be used. Of the two types of display devices now being considered by the television receiver industry, the most popular is characterized by the use of a shadow mask element positioned between a triple electron beam source and a phosphor screen made up of primary color phosphor dots arranged in triangular-spaced configuration. Each of the three electron beam sources is separately modulated by a primary color signal, and the resulting electron beam bundle is deflected and dynamically converged to pass through perforations in the shadow mask element and strike appropriately colored phosphor dots on the screen.

The second type of display device contemplated uses a single electron gun and a screen having phosphors placed thereon in lines or strips. This type of display is characterized by the use of an energized grid structure placed between the electron beam source and the phosphor screen which acts both to switch the electron beam from phosphor strip to phosphor strip and to supply a post-deflection focusing potential for narrowing the beam.

Both the shadow mask display type of color receiver circuit and the grid switching display type of color receiver utilize a conventional tuner and I. F. strip, except that the accompanying audio carrier is attenuated more sharply in the early receiver stages than is conventional in black and white television circuits. This is done in order to minimize beat patterns arising between the audio carrier and other signal components with their resultant visual effects on the display screen. The intercarrier sound takeoff is usually placed ahead of the second detector with appropriate accompanying sound traps inserted thereafter in the video channels.

After detection, the color picture signal is generally fed through one or more video amplifiers, a carrier chrominance signal trap and a signal delay circuit to supply the luminance component of the image signal.

In both receiver types the color picture signal can also be taken from the video amplifying stage or stages and fed through filters which pass the carrier-chrominance signal to a pair of synchronous detectors. A chrominance-carrier reference signal, i. e., a locally generated sine wave locked in phase and frequency with the color burst signal, is also fed to each synchronous detector for demodulating the carrier chrominance signal. The video frequency chrominance component output of each synchronous detector is then fed to appropriate matrixing networks which combine the detector output signals with the monochrome component taken directly from the video amplifier to produce primary color signals $E_R$, $E_B$ and $E_G$. In the shadow mask type of tube, these three signals are fed to the appropriate electron guns in the display device. In the grid switching line phosphor type of receiver, these three primary color signals are fed through gating circuits and sequentially applied to the single electron gun of the display tube. Both receivers require two video channels, i. e., a monochrome channel and a chrominance channel.

Thus, all conventional color television receiver design reflects the current belief of those skilled in the art that the chrominance information must be separately demodulated in synchronous detectors, separately matrixed and presented to the display device in either sequential or simultaneous fashion along with the monochrome signal carrying fine detail black and white information. Such receiver designs require critical time delay circuits, approximately thirty-six tubes, and further require a plurality of controls for balancing and adjusting parameters in complex portions of the separate chrominance channel.

It would be desirable to provide a television receiver capable of decoding a standard color television signal for display on a conventional tri-color cathode-ray tube device, which eliminates all need for a separate chrominance channel with its special synchronous detector circuits, matrixing networks and other special components which unduly complicate receiver adjustment and operation.

*Objects*

Thus, it is an object of this invention to provide a television receiver circuit suitable for decoding standard color television signals which substitutes display device action for the action of chrominance channel elements heretofore considered essential to the decoding process.

It is a further object of this invention to provide a relatively simple and economic color television receiver circuit, using a single video channel for providing both monochrome and chrominance information to the display device from a standard color television signal.

It is also an object of this invention to provide a color television receiver circuit which does not require either gating or matrixing networks to extract chrominance information from the standard color television signal.

It is still another object of this invention to provide a color television receiver circuit which eliminates the need for external synchronous detectors to extract chrominance information from the standard color television signals.

Another object of this invention is to eliminate the need of delay line circuitry in the video channel of a color television receiver.

*Circuit description*

Briefly, the invention comprises a color television receiver incorporating a display tube wherein the electron beam developed in the display tube electron gun is modulated by a combination signal comprising the composite color signal and a continuous wave modulating signal derived from the locally generated chrominance-carrier reference signal. The added modulating signal, in itself, carries no chrominance or monochrome information, but when it is used in combination with the composite color signal to continuously modulate the electron beam in a tri-color display device, the resultant is electro-optically matrixed by action of the display tube.

For a better understanding of the present invention, together with other and further objects, advantages and capabilities thereof, reference is made to the following disclosure and appended claims, in connection with the accompanying drawings, in which:

Fig. 1 is a block diagram of the preferred embodiment of the invention, and

Figures 2, 3, 4:
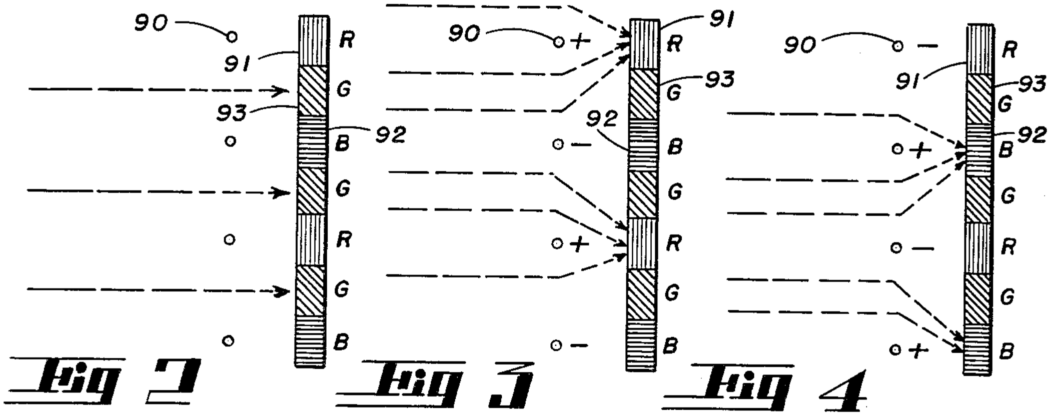
Figures 5, 6:
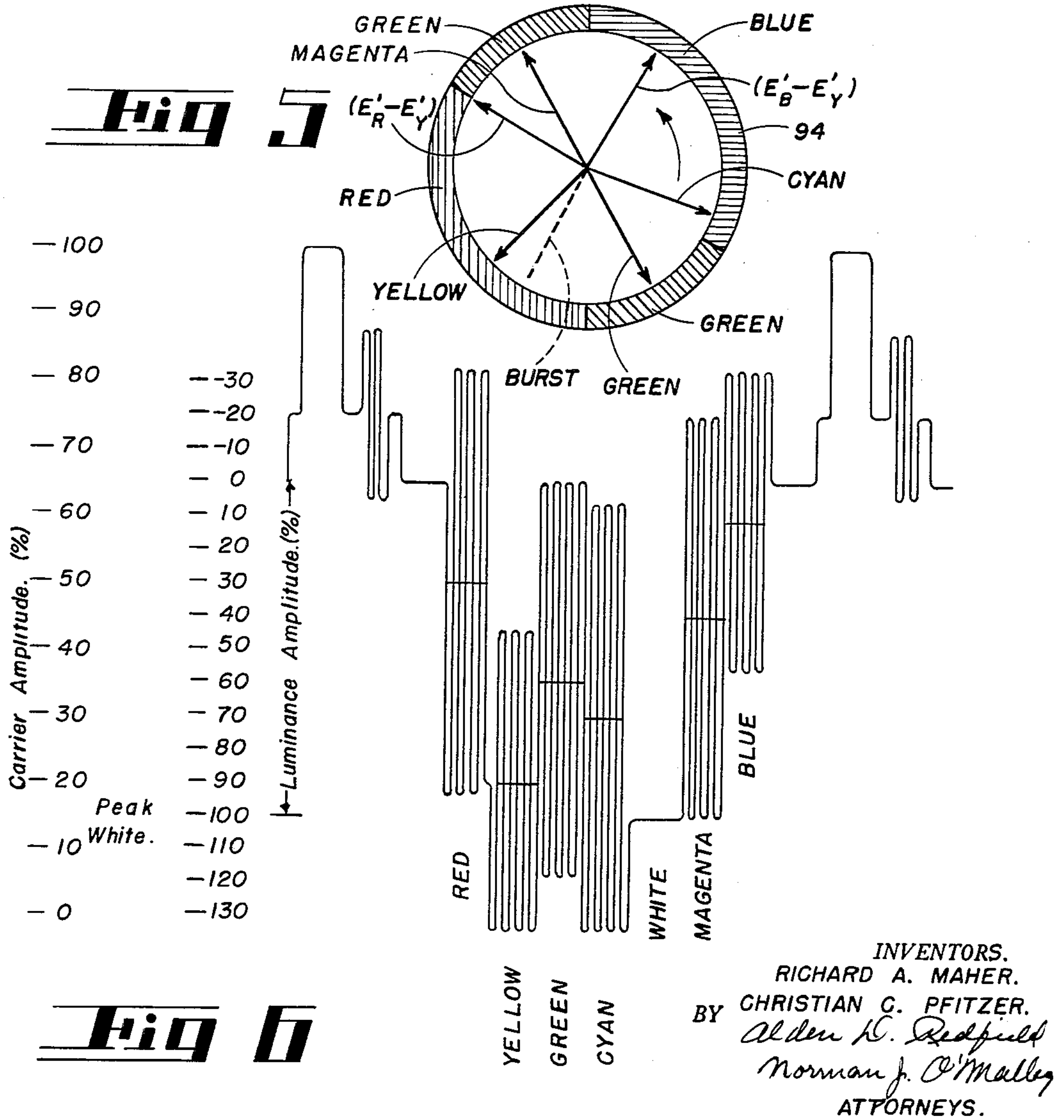
Figure 7:
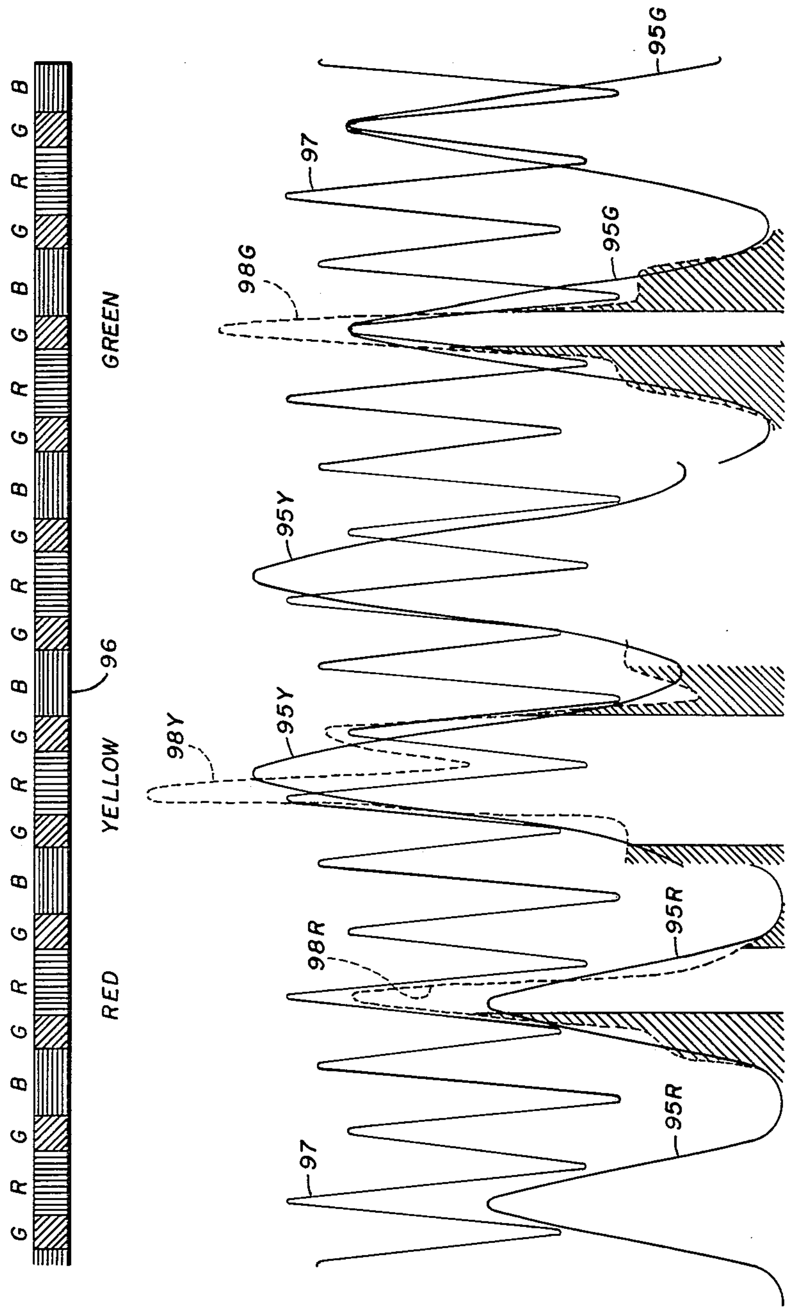
Figure 7A:
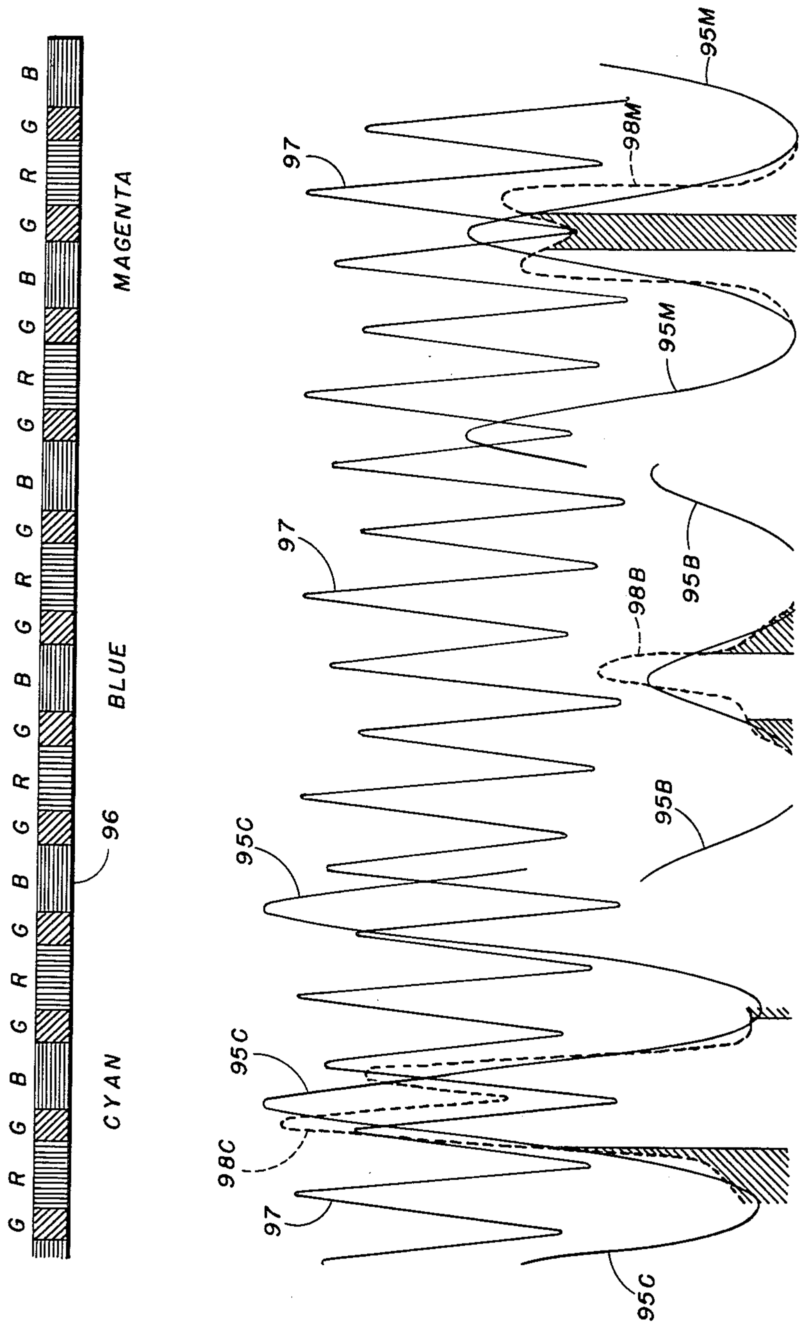
Figure 8:
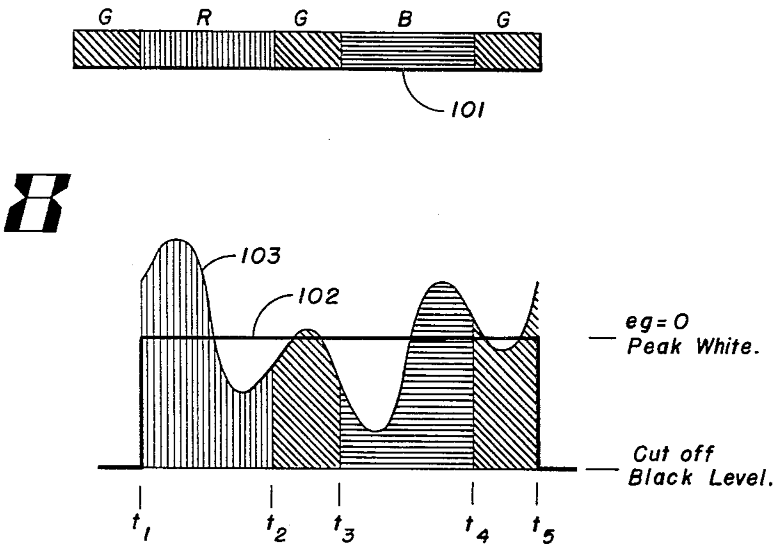
Figure 9:
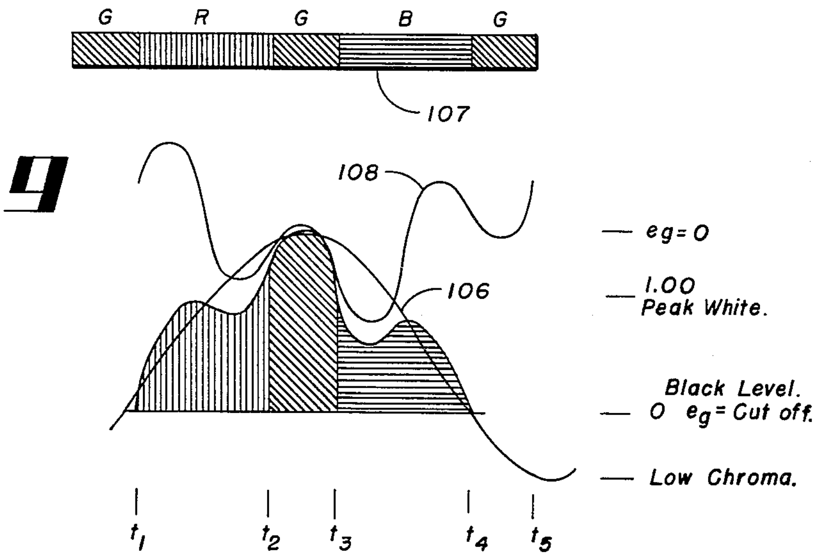
Figure 10:
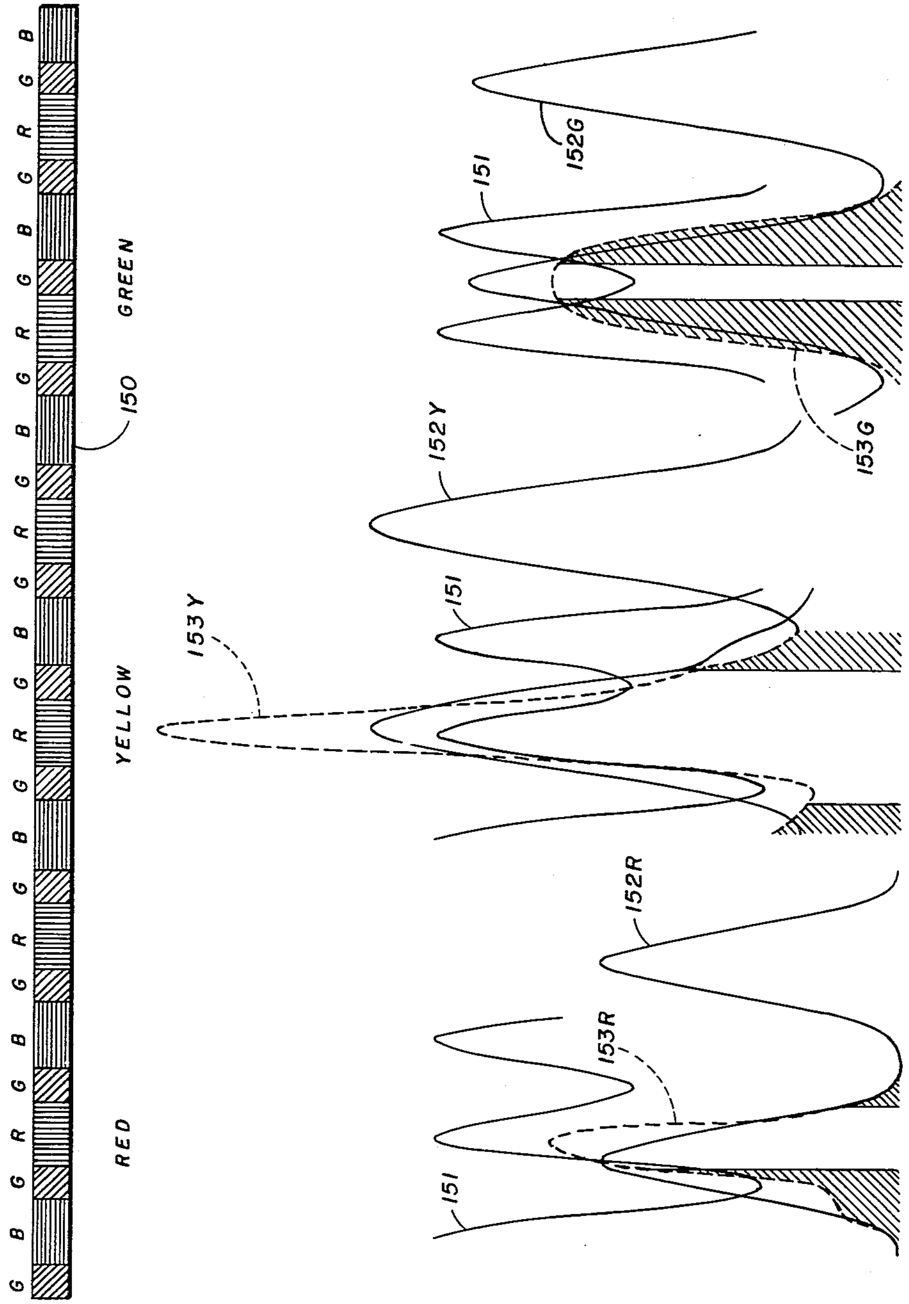
Figure 10A:
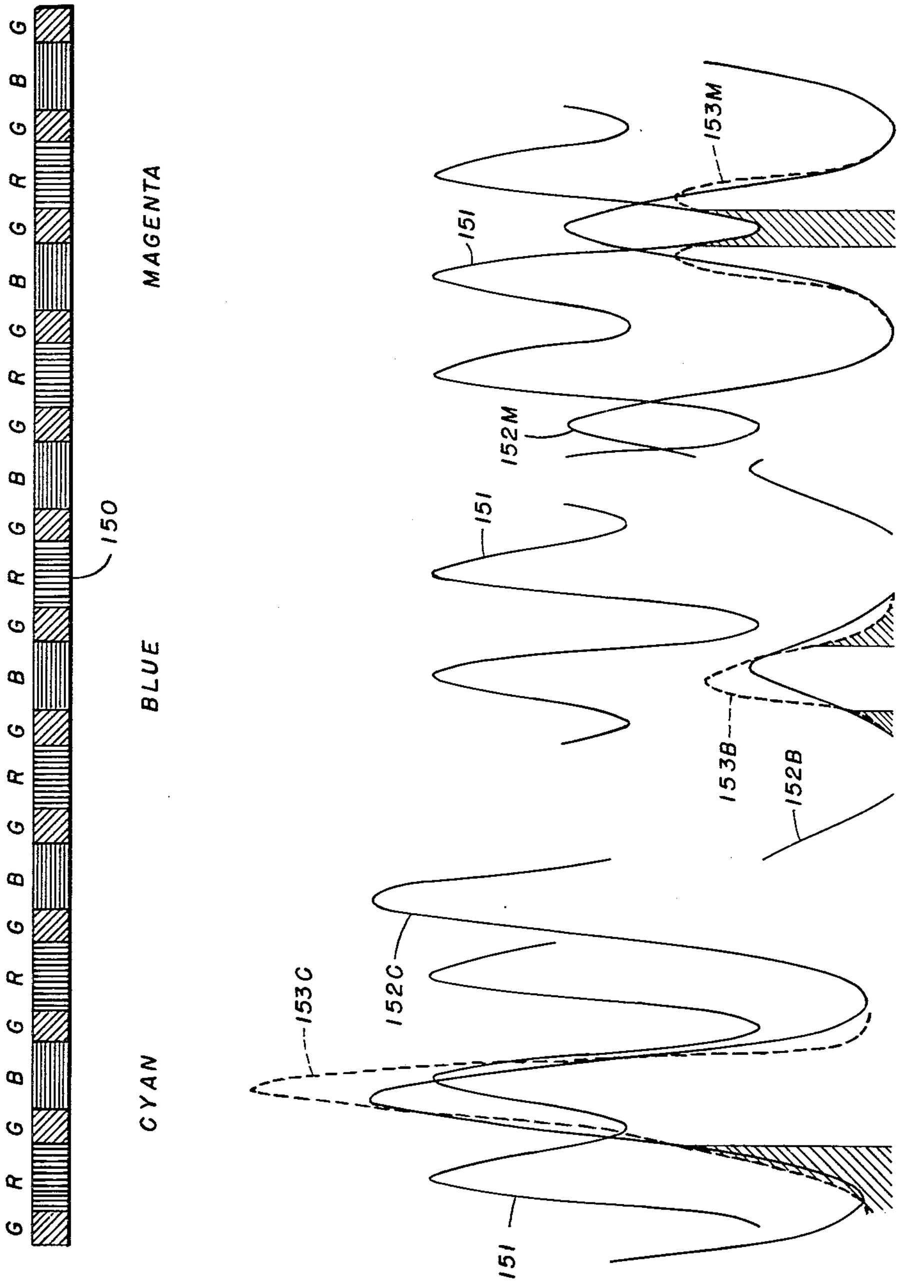

Figs. 2 through 4 show the electron beam switching action of a color presentation switching grid, and Fig. 5 is a vector diagram of the composite color signal, and Fig. 6 shows the color bar pattern modulations on a composite color signal, and Figs. 7 and 7A are curves showing the signal-combining action of the circuit of Fig. 1, and Fig. 8 is a curve showing the action of the modulating signal on a monochrome portion of a composite color signal, and Fig. 9 is a curve showing the action of the modulating signal on a chrominance portion of the composite color signal, and Figs. 10 and 10A are signal curves.

Fig. 1 shows a complete television receiver in block form embodying the preferred form of the invention. Antenna 11 feeds a complete color television signal to the input of tuner 12, wherein the signal is heterodyned by combining it with the output of a local oscillator to produce an I. F. signal which is fed to the video I. F. strip. If desired, an automatic gain control signal also may be used to adjust the bias potential of desired stages of video I. F. strip 13 or tuner 12. Though not specifically shown, the accompanying audio carrier signal is strongly attenuated prior to the audio carrier takeoff point immediately following video I. F. strip 13. This is conventional circuitry, forming no part of the invention and thus not shown in detail.

The audio carrier takeoff point shown following the video I. F. strip 13 in Fig. 1 assumes that an "intercarrier sound" type of circuit is to be used. However, a separate audio channel may be provided if desired. The audio channel is completely conventional and comprises an audio I. F. strip 14, discriminator 15 and audio amplifier 16. The accompanying sound is further attenuated at the input of video detector 17. Thus, the output of the video detector can be assumed to provide a composite color signal without audio or audio carrier.

Assuming that two stages of video amplification are desired, though this need not be the case, the composite color signal is fed through video amplifier 18 and video amplifier 19, D. C. restored by unit 20 and impressed on a modulating electrode of display device 21. It is to be noted that the whole composite color signal is impressed on the modulating electrode of display device 21, and that all the monochrome and chrominance information contained in this signal reaches the display tube through a single channel. By controlling the video passband characteristics of this channel the chrominance information can be emphasized relative to the brightness information in the signal. For saturated colors as much as a 6 db boost of chroma may be necessary. This is to be contrasted with present conventional circuitry, wherein the carrier-chrominance signal is trapped out of the monochrome channel and supplied to the display device through a separate chrominance channel after appropriate matrixing and gating operations.

Line and field scanning of the electron beam in the display device is controlled in conventional manner. A signal taken from the video amplifying stage 18 is fed through a sync separating circuit 40 whose purpose is to strip the video information from the sync information and supply an output signal used to control both the vertical deflection circuitry 41 and the horizontal deflection circuitry 42. If desired, the horizontal deflection circuitry may include a "flyback" source of high potential of the same type as used in monochrome or black and white television receivers.

The composite color signal is also fed from the video amplifier stage 18 to a burst gate circuit 25. The burst gate is a device which normally blocks passage of any signal, opening solely to pass the color burst signals which are transmitted on the "back porch" of each horizontal synchronizing pulse. Thus, the output of the burst gate is an intermittent signal or series of color burst signals which are fed to a phase detector 26. The D.-C. output of the phase detector controls the reactance tube circuit 27 which, in turn, controls a local oscillator 28 supplying the chrominance-carrier reference signal. The output of the chrominance-carrier reference signal oscillator 28 is also fed to phase detector 26 from comparison with the color burst signals taken from burst gate 25. Thus, the phase and frequency error, if any, between the color burst signals and the chrominance-carrier reference signals is automatically corrected.

The chrominance-carrier reference signals are fed through a phase control circuit 29 to a switching amplifier and grid drive circuit 32. The output of the switching amplifier and grid drive circuit 32 is fed directly to the switching grid element 33 in display device 21 and also through a modulating signal-producing circuit 34. The modulating signal circuit 34 feeds an output signal to a separate modulating electrode 35 in display device 21.

The modulating signal source 34, as shown in the preferred embodiment of Fig. 1, comprises two separate but similar circuits having a common input signal and a common output. The input signal is supplied to both circuits from the switching amplifier and grid drive circuit 32 through a magnetically coupled path, including primary coil 51 and secondary tuned circuits 52 and 53 which are tuned to the frequency of the chrominance reference signal. The output from tuned circuit 52 is taken from across a resistance 54 having a grounded center tap and fed through a phase-shifting network comprising resistor 55 and capacitor 56 to the control grid 57 of tube 58.

Thus, the signal impressed on the control grid of tube 58 is phase and frequency-related to the chrominance-carrier reference signal. A self-biasing network, such as resistance 59 and capacitor 60, may be used in the cathode circuit of tube 58. Anode potential may be supplied from a source of B+ potential, not shown, through an anode resistor 61 and a parallel resonant network comprising capacitor 62 and inductance 63 tuned to resonate at the third harmonic of the chrominance-carrier reference signal. Amplitude control of the output signal may be provided by potentiometer 64 in the screen grid supply circuit. Bypass capacitors, such as capacitors 65, 66 and 67, may be provided where necessary. The output filter network comprising inductance 68 and capacitance 69 is tuned to resonate and block signals at the chrominance-carrier reference frequency and pass third harmonic signals.

The circuit including tube 70 may be substantially identical to the circuit including tube 58, with the exception of the tuned circuits in the output. The parallel resonant circuit coupled between the source of anode potential and the anode of tube 70, comprising capacitance 71 and inductance 72, is tuned to the chrominance-carrier reference frequency, while the filter network comprising capacitor 73 and inductance 74 is tuned to resonate at and block third harmonics of the chrominance-reference signal, passing first harmonic signals. The outputs of both circuits are applied in common through coupling capacitor 75 to modulating electrode 35 of display device 21. Thus, the modulating signal on G-2, or electrode 35, comprises a signal having a wave form which is frequency and phase-related to the chrominance-carrier reference signal, and in the preferred embodiment this frequency relationship involves fundamental and third harmonics.

This modulating signal may take several forms. In the preferred embodiment, as has been brought out, the modulating signal comprises the sum of the first and third harmonics of the chrominance-carrier reference signal. In still a third embodiment the modulating signal comprises a saw-tooth wave having a pulse repetition frequency equal to the frequency of the chrominance-carrier reference signal.

Operation of display device 21 can best be understood by reference to Figs. 2 through 4. As can be seen, the color phosphor screen is arranged in parallel phosphor strips, each phosphor strip fluorescing with a given primary colored light upon bombardment by an electron stream. A single electron gun is used to produce the electron stream which is deflected in the usual manner, i. e., either magnetically or electrostatically. Between the deflecting field and the plane of the phosphor screen, a grid structure is arranged to provide further deflection and correct registration. This grid comprises a series of parallel wires or conducting strips lying in a common plane adjacent and parallel to the plane of the phosphor screen, with the longitudinal axis of each grid wire being positioned parallel to the longitudinal axis of a phosphor strip.

The tube is arranged to operate with the phosphor strips parallel to the grid wires. However, the raster lines need not be parallel to the phosphor strips, even though this may be preferable in practice to satisfy the viewer who has become accustomed to seeing the horizontal raster line structure in the average monochrome display. Further, the width of each phosphor strip is limited by the electron beam spot diameter which, in turn, becomes a limitation on the number of strips possible in a screen of a given size. Where the number of phosphor strips is limited by the size of the screen, maximum resolution is obtained in the dimension parallel to the phosphor strips. For this reason, if for no other, in small tubes the phosphor screen strips are generally arranged parallel to the raster lines.

As can be seen in Figs. 2 through 4, one-half of the grid wires 90 are in optical alignment with the red phosphor strips 91, and the other half of the grid wires are in optical alignment with the blue phosphor strips 92. All of the wires corresponding to red strips are brought to one external grid drive circuit terminal, and all of the wires corresponding to the blue strips are brought to another and separate grid drive circuit terminal. The grid structure then may be energized by the signal output of grid drive circuit 32 in such manner that adjacent grid wires are cyclically energized at the same or different potential.

Compared to a conventional monochrome tube, the grid switching type of tricolor tube uses a relatively low potential between the first and second anodes. This means that less deflection energy is required to deflect the electron beam in the normal manner across the area of the grid plane. As a result, however, the electron beam at this point is relatively soft, i. e., the beam is relatively thick, and if it were allowed to strike the screen without being narrowed, substantial color error would appear. To avoid color error, a post-deflection voltage is supplied between the grid structure and the metallic backing of the phosphor screen, which acts as an electron lens to harden and narrow the electron bundle, making it possible to register the beam on phosphor strips of a selected color without substantial overlap.

This electron lens action and switching action of the grid is shown in Fig. 2 for the condition when all of the grid wires are at the same potential. At this instant of color presentation, it is seen that the electron beam is focused on the center or green strips 93. When a potential difference of the proper magnitude is applied between the two sets of grid wires by the grid drive circuit 32, the beam will be deflected to the phosphor strip lying under the most positive grid wire and away from the remaining phosphor strips. In Fig. 3 the grid wires positioned adjacent the red phosphor strips are shown to be positive relative to adjacent grid wires and, as can be seen, the incident beam is deflected towards the red phosphor strips. Likewise, as shown in Fig. 4, when the grid wires positioned adjacent the blue phosphor strips are made positive relative to adjacent grid wires, the incident beam is deflected toward the blue phosphor strips and away from the red and green strips.

The grid switching type of tricolor display device is generally considered as being limited to sequential operation, since there is but a single gun or electron source provided. As the beam is deflected through action of the deflection field and grid switching control from phosphor strip to phosphor strip, it is necessary to modulate the electron beam with the particular color information, if any, which corresponds to the color strip being scanned at the particular instant in question. Thus, when the red strip is under bombardment the electron beam is modulated with red information. Likewise, during the instant that green or blue information is being modulated on the electron beam, the grid switching action should present the beam to the green or blue strips, respectively.

The inherent capacitance between the wires of the switching grid makes it difficult, from a power-efficiency viewpoint, to drive the grids with anything other than a sine wave voltage which acts to fix the sequence and length of the color presentation periods as a function of the grid drive voltage frequency and the width and color sequence of the phosphor strips on the screen. This is best shown by the vector diagram of the composite color signal in Fig. 5 where the color presentation periods of display using a sine wave voltage-driven switching grid and phosphor screen of the type shown in Figs. 2 through 4 are indicated by the shaded circles at 94.

As has been stated, the hue information contained in a composite color signal is proportional to the phase displacement between the color burst signals and the carrier-chrominance signal, which may be considered as a single rotating vector, as shown in Fig. 5. Even though the carrier-chrominance signal may be considered to present all chrominance information in simultaneous fashion, it can be seen from the vector diagram in Fig. 5 that the rotating vector must take a given phase position relative to the burst signal for each different hue transmitted. For example, when a green signal is transmitted, the signal vector leads the burst signal by a given number of degrees, as shown, and does not change its phase position relative to the burst signal until a different hue is transmitted. It is to be noted that the actual hue sequence of the signal depends entirely upon the hue of the object, and it should be clear that the rotating vector need not rotate through 360 degrees between each increment of any given hue information being transmitted. When the signal hue changes, the signal vector moves through a transition period, taking up a new phase position. Thus, it can be seen that the sequence of the hue information is not definite or fixed, but depends entirely upon changes in object hue.

Even so, it can be seen from the vector diagram of Fig. 5 that there is a fixed hue phase sequence relative to the burst signal. That is, a green signal must lead the burst signal by a fixed number of degrees, and a cyan signal must lead the green signal by a fixed number of degrees, and so on, around 360 degrees. In other words, each bit of different hue information has a fixed phase angle relative to the burst signal, and the signal can be considered to present transmitted hue information in a fixed time phase sequence relative to the burst, regardless of the indefinite nature of the actual color sequence of the signal transmitted.

Considering the color presentation periods shown at 94 to be fixed in phase relative to the burst in the positions shown, it can be seen that the display hue phase presentation sequence is green, blue, green, red, green, etc. On the other hand, the signal primary hue phase sequence relative to the burst is green, blue, red, green, blue, etc. Thus, if it is desired to impress the composite color signals directly on a modulating electrode of a display having a color presentation sequence similar to that shown in Fig. 5 at 94, or on a display having any other color presentation sequence different from the color signal hue phase sequence, it is necessary to at least phase-modify either the composite color signal directly or its effect on the display beam in order to bring the signal hue phase sequence into coincidence with the fixed hue presentation sequence of the display.

Our invention substantially accomplishes this desired result by combining the action of a modulating signal voltage on the display beam with the action of the composite color signal on the display beam to effectively bring the two hue phase sequence periods into approximate time coincidence, regardless of the type of picture being presented. Before considering this combining action in detail, it is best to first consider the shape of a typical composite color signal in the form realized at the output of the second detector 17, as shown in Fig. 1.

A typical composite color signal, in the form seen at the second detector, upon which a color bar pattern has been modulated is shown in Fig. 6. Each color represented is fully saturated and each color component of the carrier-chrominance signal swings about an A. C. axis having a voltage level equal to its contribution to the luminance component $E_Y'$ of the composite signal. Since $$E_Y' = .30\ E_R' + .59\ E_G' + .11\ E_B'$$

it can be seen that the red signal contribution to luminance is equal to 30% of the total luminance. Thus, the red portion of the carrier-chrominance signal swings about an A. C. axis on the 30% luminance level line. Green contributes 59% of the luminance signal, and thus the green portion of the carrier-chrominance signal swings around the 59% luminance level line. In like manner, since the blue signal contributes 11% to luminance, the blue portion of the carrier-chrominance signal swings about the 11% luminance level line.

The yellow signal includes both red and green, while the cyan signal includes both green and blue. Magenta is made up of red and blue. The luminance percentage contribution of yellow, cyan and magenta is equal to the sum of the luminance portion of the primary color signals which are combined to form each of these colors. Thus, the yellow carrier-chrominance signal swings about the 89% luminance level line, i. e., the sum of the 59% luminance contributed by the green signal and the 30% luminance contribution by the red signal. The cyan portion of the carrier-chrominance signal is seen to swing about a luminance level of 70%, which is equal to the sum of the green and blue luminance percentages. In like fashion, the magenta portion of the carrier-chrominance signal swings about the 41% luminance level line, which is the sum of the red and blue signal luminance contributions. Action of the modulating signal on a composite color signal of the type shown in Fig. 6 can now be considered.

Assuming that display device 21 is a square law device, i. e., that the transfer characteristic or relation between the control grid voltage and the beam current follows a square law relationship, and further assuming that the color bar signal of Fig. 6 is impressed upon the control grid of display device 21 with a 20 to 1 contrast ratio, the resulting beam current will be approximately as shown by curve 95 of Figs. 7 and 7A. The curve representing the red portion of the signal is identified as 95–R, and the yellow portion of the signal is shown at 95–Y. The green, cyan, blue and magenta portions of the signal are represented by the curves 95–G, 95–C, 95–B and 95–M respectively.

The composite color signal is impressed upon the control grid of device 21 with the sync signals in the negative going polarity direction. As can be seen in Fig. 6, the red and blue portions of the carrier-chrominance signal swing about an A. C. axis which is nearer cutoff than the A. C. axes of the magenta, cyan, green and yellow portions of the signal. There is a resulting obvious compression of the negative going peaks of the red and blue carrier-chrominance signal, due to the non-linear characteristic of the display input circuit. Thus, curves 95–R and 95–B have sharp positive peaks and noticeably compressed negative peaks.

The carrier-chrominance signal, in effect, establishes the time base against which all other signals fed to the display device must be adjusted, including the grid switching or color presentation control voltage. The grid switching drive voltage is usually sine wave in form, and thus cyclically directs the beam current, as was explained with reference to Figs. 2 through 4, from the green phosphor strip up through the red phosphor strip back through the green phosphor strip on to the blue phosphor strip during each cycle. Thus, the beam remains on each phosphor strip for a given time or color presentation period, as shown on the curves of Figs. 7 and 7A at 96.

For example, the period during which the display beam impinges on a red strip is designated by the letter R, and the period during which the beam impinges on a blue strip is designated by the letter B. The phase position of the carrier-chrominance signal is adjustable by virtue of a phase control circuit incorporated in element 29 of Fig. 1. Advancement of the relative phase position of the grid drive voltage shifts the color presentation time period designations 96 to the left, and phase retardation of the grid switching drive voltage shifts the color presentation period designations 96 to the right on the curves of Figs. 7 and 7A. Though the preferred phase position is shown, it is to be understood that the circuit will operate through a limited range of phase positions.

The phosphor efficiency and hue correcting modulation signal, which is impressed on the elements of display device 21, is fed from the modulating signal source 34 to display device electrode 35. In the preferred embodiment, this modulating signal has the general shape as shown by curve 97 and includes the first and third harmonics of the chrominance-carrier reference signal. As has been explained, modulating signal source 34 incorporates phase and amplitude controls. The phase of the modulating signal relative to the carrier-chrominance signal in the preferred embodiment is as shown by curve 97, though here again the specific phase position indicated is not the sole position for successful operation.

As far as beam current is concerned, display device 21 acts as a product modulator, and thus the total beam current is always proportional to the instantaneous product of the signals represented by curves 95 and 97, if it be assumed that the control characteristic of G–2 or electrode 35 is relatively linear. In order to simplify the drawings, each color contained in a typical color bar signal is represented by only two cycles of curve 95 with a resultant product curve 98 for only one cycle thereof. In actual practice, many cycles occur in each transmitted color, but the relative phase positions remain the same for each cycle.

The optimum relative phase positions of the signals applied to display device 21 may be found by following a simple setup procedure: First, a color bar composite color signal is impressed on the display device control grid, and the relative phase position of the grid switching driving voltage taken from switching amplifier 32 is adjusted by means of phase control 29 so that the display device reproduces the magenta color bar in green. In the curves of Fig. 7A it can be seen that the curve 95–M peaks during the period when the grid drive switching signal causes the electron beam to impinge upon the green strip. Next, a black and white picture or monochrome signal is impressed on the control grid of the display device. The third harmonic signal source in the modulating signal circuit 34 is disconnected and the first harmonic signal alone applied to display device electrode 35. The amplitude and phase of this first harmonic modulating signal is then adjusted until the resultant image is reproduced in black and white, substantially correcting for variations in phosphor efficiencies and light contribution from each phosphor strip. In the third step the monochrome signal is removed and the color bar signal again impressed on the control grid of display device 21. The third harmonic component of the modulating signal is then added to the first harmonic portion, and the complete modulating signal is fed to electrode 35. Next, the phase and amplitude of the third harmonic component is adjusted so that the magneta bar is displayed in true color.

As can be seen in Fig. 7A, the effect of the modulating signal, when properly phased, is to suppress the peak of the magenta signal 95–M and phase-shift or widen it sufficiently at 98–M to cause the electron beam to be presented timewise to both the blue and red phosphor strips. This action, from the viewpoint of the vector diagram of Fig. 5, is equivalent to breaking the magenta vector into two components, i. e., a red vector component and a blue vector component. Since magenta includes both red and blue, these two vector components will be added together by the eye of the viewer and appear as the true magenta color, though slightly desaturated, due to the presence of some green. Since the resulting signal or beam current 98–M crosses the D. C. axis at a different position than the original signal 95–M, it can be said that the effect of the modulating signal is to phase-shift the magenta signal as well as to break it down into its red and blue components.

Finally, it may be necessary to adjust the phase and amplitude of the modulating signal slightly to realize the full gamut of colors present in a typical color bar pattern. The resulting image colors, as can be seen from the curves of Fig. 7, are slightly desaturated. However, it has been found that skin tones appear in true color, and the slight desaturation involved can be seen only by critical comparison between the reproduced colors and the object colors being transmitted. Even then, the coloring, though not absolutely perfect, is pleasing and highly satisfactory.

The resulting slight color desaturation in the reproduced image for steady state color presentation, i. e., other than color transition periods, can be seen by comparing the time periods involved in each product curve of Figs. 7 and 7A with the color presentation periods, if it be assumed that the phosphors are tightly grouped together without any gaps appearing between strips.

For example, product curve 98–R is a curve representing point by point multiplication of the ordinate values of curve 95–R and curve 97, and it indicates the amount of beam current flowing during one cycle of the carrier-chrominance signal when modulated with highly saturated red information. As can be seen, during this period the beam current is presented to the red phosphor strips on the display device screen with some low amplitude overlap in the green and blue color presentation periods. The overlap portions or color error portions of the curves are shaded. The resulting color impurity slightly desaturates the red image by an amount which is related to the duty cycle of the overlap and the phosphor efficiency of the blue and green strips on the display device screen.

Curve 98–Y is an instantaneous point-by-point product of curve 97 and curve 95–Y, and indicates the amount of beam current flowing when the carrier-chrominance signal is carrying yellow information. Since yellow is composed of both red and green, the overlap of curve 98–Y in the blue color presentation period acts to slightly desaturate the resulting yellow portions of the image. Curve 98–G represents the beam current flowing during one cycle of the carrier-chrominance signal when modulated with green information. The sharp, high peak of the curve centers on the green strip with lower amplitude overlaps into the adjacent red and blue color presentation periods. Here again, this overlap acts to desaturate green portions of the resulting image.

Cyan, which is an additive combination of blue and green, is reproduced with a very high degree of accuracy. The instantaneous point-by-point product of curves 97 and 95–C results in a curve 98–C which peaks in both the green and blue color presentation periods with a slight overlap of low amplitude into the red color presentation periods. Curve 98–B peaks during a blue presentation period with low amplitude overlaps in the adjacent green periods. The resulting desaturation is slight. Magenta, which is a combination of red and blue, is the most difficult color to reproduce without noticeable error, since the carrier-chrominance signal modulated with magenta information peaks during the second green color period in each color presentation cycle. Modulating signal 97 acts to correct the error by suppressing beam current during the green period and by accentuating beam current during the blue and red color presentation periods.

The curves of Figs. 7 and 7A show the special case when the input composite color signals contain highly saturated chrominance information. The curves of Figs. 8 and 9 have been included to show the general case when monochrome information, as well as reasonably saturated color signals, are being received. In Fig. 8 the color presentation periods are shown at 101. A monochrome signal $E_Y'$ or the beam current produced by such a signal, is shown at 102. The length of the monochrome signal from $t_1$ through $t_5$ covers a minimum picture element, i. e., one complete color presentation cycle. The modulating signal impressed on $G_2$ comprising the sum of the first and third harmonic of the chrominance-carrier reference signal, is shown at 103.

Since a tricolor display inherently functions to produce black and white pictures by combining the primary colors in correct proportion, if it be assumed that equal energy receiver primaries are used, it is necessary that the combined action on the display beam intensity of the monochrome portion of the composite color signal and the modulating signal provide equal light output from each color phosphor subarea scanned in any given picture element, in order that the image may appear as white or a shade of gray. The curves of Figs. 8 and 9 show only the integrated beam current or beam intensity during each scan of a picture element color phosphor subarea. The light output of each phosphor subarea is a product of the phosphor efficiency of the subarea and the integrated beam current.

As can be seen in Fig. 8, the modulating signal appears to peak the monochrome information during the early part of the red color presentation period and suppress action of the input signal on the display beam during the trailing portion of the red color presentation period. During the first green presentation period the monochrome signal is slightly peaked at the center and suppressed at both the leading and trailing portions. During the blue color presentation periods the monochrome signal is first suppressed and then peaked. During the second green color presentation period it can be seen that the monochrome signal is slightly suppressed at the center of the presentation period.

Since the area beneath the modulating wave 103 from $t_1$ to $t_2$ is proportional to the beam intensity during the red color presentation period in a given monochrome picture element, the light output during this same period is a function of the product of this area times the phosphor efficiency of the red phosphor. In like manner, during the first green color presentation period from $t_2$ to $t_3$, though the area under the modulating signal or curve 103 is proportional to the integrated display beam intensity, the total light output during this period depends, in addition, upon the phosphor efficiency of the green phosphor picture element subarea.

It has been found, in one particular embodiment tested, that the first and third harmonic of the chrominance-carrier reference signal, when combined and phased, as shown at 103 in Fig. 8, provides integrated beam current of the correct intensity to produce substantially equal light output from each color phosphor subarea in a given tricolor display device. Such a modulating signal corrects for variations in phosphor efficiency during monochrome period portions of the composite color signal by making the electron beam intensity substantially inversely proportional to the phosphor efficiency of the phosphor subarea under scan.

An analysis of the actual phosphor efficiencies of the display device tested is not necessary to an understanding of the present invention. Various combinations of phosphor efficiencies might be used, as long as the product of the phosphor efficiency of any given picture element subarea and the integrated beam current produced during a monochrome signal scan of that subarea is made equal to the product of the beam current intensity and phosphor efficiency of the remaining picture element subareas. As the phosphor efficiency of a subarea is increased, the integrated beam intensity may be decreased. If, for some reason, the phosphor efficiency of a subarea be decreased, then it follows that the integrated beam intensity must be increased during scan of this particular phosphor subarea. If the selected receiver primaries are such as to require unequal light contribution to produce white, then the modulating signal can be adjusted to increase or decrease beam intensity as desired during the proper color presentation period.

The modulating signal selected must not only compensate for differences in phosphor efficiencies during monochrome information periods of the composite color signal, but it must also modify or phase shift the chrominance portion of the composite color signal to make the hue information contained in the signal coincide with the proper color presentation periods. This action of the modulating signal has been shown in connection with Figs. 7 and 7A for the special case of a composite signal containing highly saturated chrominance information. The general case is best shown in Fig. 9 where the curve 106 represents chrominance information as modulated on the display beam by the composite color signal. From its phase position relative to the color presentation periods 107, it can be seen that the signal generally peaks at green. Modulating signal 108 acts to distort or modify the chrominance signal wave 106 to make it peak more sharply during the green color presentation period. The resulting correctly reproduced green hue is slightly desaturated, due to phase and amplitude modification of the composite color signal.

Modulating signals other than the fundamental and third harmonic of the chrominance-carrier reference signal may be used. For example, a properly phased modulating signal comprising the fundamental and second harmonic of the chrominance-carrier reference signal also produces satisfactory results. The circuit required is similar to the circuit of Fig. 1, except that two of the tuned circuits in the modulating signal source 34 are modified to resonante at the second harmonic of the chrominance-carrier reference signal in lieu of the third harmonic. One of these tuned circuits is in the plate circuit of tube 58, comprising capacitor 62 and inductance 63, and the second comprising inductance 74 and capacitor 73 is in the output circuit of tube 70.

When these two networks are tuned to resonate at the second harmonic, a modulating signal is fed to the display device electrode 35 which is shaped not only to provide phosphor efficiency correction during monochrome signal information periods, but also to provide phase correction during chrominance portions of the composite color signal so as to bring the signal hue information in substantial coincidence with the proper display color presentation periods.

This can best be seen by reference to the curves of Figs. 10 and 10A where the color presentation periods of the display are shown at 150 and the modulating signal impressed on electrode 35 of the display device 21 is represented by the curve 151. The composite color signal is represented by curves 152–R, 152–Y, 152–G, 152–C, 152–B and 152–M, with the letters designating the particular hues of a typical color bar pattern. The same assumptions have been made with regard to the curves of Figs. 10 and 10A which were made with regard to the curves of Figs. 7 and 7A, viz., that a 20 to 1 contrast ratio is used, that the display device follows a square line function insofar as the composite color signal input is concerned and that the modulating signal controls the electron beam in substantially linear fashion.

The electron beam current flowing in the display device 21 during the various hue periods of the composite color signal is shown by the dashed curves 153–R, 153–Y, 153–G, 153–C, 153–B and 153–M, which are product curves indicating the instantaneous product of the modulating signal 151 with portions of the composite signal 152–R, 152–Y, 152–G, 152–C, 152–B and 152–M.

As can be seen, the resultant electron current flow is not entirely confined to the desired color presentation periods, and as a result each hue is slightly desaturated because of color error. For example, the base portion of curve 153–R extends into the green color presentation periods and slightly into a blue color presentation period with a resulting slight desaturation effect. Curve 153–Y, which ideally should be confined to the red and green color presentation periods of the display, spills over into the blue presentation periods with a desaturation or color error effect which is scarcely noticeable to the naked eye. The major color error appears when the signal contains considerable green information, as can be seen by the curves of 153–G. Overlap into the red and blue color presentation periods desaturates green portions of the reproduced image. However, even though the curves do indicate considerable color contamination at this point, the actual green reproduced on the screen is quite pleasing and difficult for a viewer who has no knowledge of the true object hue, to criticize from a color error viewpoint. Cyan and blue, as shown by curves 153–C and 153–B, respectively, are accurately reproduced with a slight color error, shown by the dashed lines. This amount of color error is so negligible as to be relatively undetectable. Again, the magenta portion of the reproduced image contains undesired green, as shown by the overlap of curve 153–M into the green color presentation period. Even so, the magenta portion of a color bar pattern is displayed in a highly satisfactory manner, and the slight amount of green involved does not appear commercially objectionable.

The modulating signal may be mixed with the composite color signal in a separate tube if desired, and the output fed to the modulating or control electrode of the display. The modulating signal may also be shaped in the form of a serrated wave having the same repetition frequency as the chrominance-carrier reference signal and phased to minimize the magenta signal during the green color presentation period. Undoubtedly there will occur to those skilled in the art other non-gating modulating signals having shapes which satisfy the two basic requirements found necessary to satisfy image reproduction, i. e., a signal which first corrects for variations in display phosphor efficiency during the monochrome portions of the composite color signal and which also brings the composite color signal hue information into substantial time phase coincidence with the appropriate color presentation periods of the display.

The color error or color impurity shown in the dashed portions of the curves of Figs. 7, 7A, 10 and 10A is related to the electron beam dot size and also to the width of the gaps between phosphor color strips. In explaining operation of the preferred embodiment of the invention heretofore, it has been assumed that the phosphor strips completely filled the screen area. This can be best seen in Figs. 7 and 7A at 96 where the color presentation periods are separated by a fine line of demarcation in lieu of a narrow space. In actual practice some space exists between strips, and as the spacing is increased the resulting color error is decreased, with a slight loss of overall light output.

While we do not desire to be limited to any specific circuit parameters, such parameters varying in accordance with the requirements of individual designs, the following circuit values have been found entirely satisfactory in one successful embodiment of the invention, in accordance with Fig. 1:

| | |
|---|---|
| Tubes: | |
| 58 | 6CB6 |
| 70 | 6CB6 |
| Resistors: | |
| 54 | 200,000 ohms |
| 55 | 25,000 ohms |
| 59 | 180 ohms |
| 61 | 1,000 ohms |
| 64 | 1 megohm |
| Capacitors: | |
| 56 | 7 mmf. |
| 60 | .005 mf. |
| 62, 73 | 20–100 mmf. (variable) |
| 65 | .005 mf. |
| 66 | .005 mf. |
| 67 | .005 mf. |
| 69, 71 | 7–35 mmf. (variable) |

While there has been shown and described what is at present considered the preferred embodiment of the present invention, it will be obvious to those skilled in the art that various changes and modifications may be made therein without departing from the invention as defined by the appended claims.

We claim:

1. In a color television receiver for receiving standard modulated composite color television waves including video signals consisting of luminance components and color subcarrier components representative of hues and saturations, and also including horizontal and vertical synchronizing signal components and color burst signal components, the combination of: First, a cathode ray picture tube having at least one beam-intensity modulating electrode adapted to have video signals applied thereto, horizontal and vertical beam-deflecting electrodes adapted to have deflecting signals applied thereto, a display screen against which electrons from said gun are directed and comprising a base having disposed thereon horizontal strips of phosphors respectively emissive of light of different primary colors additive to produce white light, said strips being disposed in a cyclically repeating pattern of groups emissive of light of all of said colors, and color grid elements adapted to have color switching signals applied thereto; Second, a source of such composite color television waves; Third, means coupling said source of composite color television waves to a beam-intensity modulating electrode of said tube; Fourth, means for recovering and converting the horizontal and vertical signal components into deflecting signals and applying the same to their respective sets of beam-deflecting electrodes; Fifth, a color subcarrier oscillator; Sixth, means controlled by the horizontal synchronizing components for recovering the color burst signals to supply reference signals; Seventh, means including a phase detector for comparing the relative phases of the color subcarrier oscillator output and the recovered color burst reference signals to produce a corrective effect compelling the oscillator to operate in a desired phase relationship relative to such reference signals; Eighth, means for applying an output of the color subcarrier oscillator to said color grid elements to switch the same; and Ninth, modulating means intercoupling said oscillator and a beam-intensity modulating electrode of such picture tube in such a manner as to provide at such electrode modulations including at least a low-order harmonic of the output frequency of said color subcarrier oscillator.

2. In a color television receiver for receiving standard modulated composite color television waves including video signals consisting of luminance components and color subcarrier components representative of hues and saturations, and also including horizontal and vertical synchronizing signal components and color burst signal components, the combination of: First, a cathode ray picture tube having at least one beam-intensity modulating electrode adapted to have video signals applied thereto, horizontal and vertical beam-deflecting electrodes adapted to have deflecting signals applied thereto, a display screen against which electrons from said gun are directed and comprising a base having disposed thereon horizontal strips of phosphors respectively emissive of light of different primary colors additive to produce white light, said strips being disposed in a cyclically repeating pattern of groups emissive of light of all of said colors, and color grid elements adapted to have color switching signals applied thereto; Second, a source of such composite color television waves; Third, means coupling said source of composite color television waves to a beam-intensity modulating electrode of said tube; Fourth, means for recovering and converting the horizontal and vertical signal components into deflecting signals and applying the same to their respective sets of beam-deflecting electrodes; Fifth, a local source of signals of color subcarrier frequency; Sixth, means controlled by the horizontal synchronizing components for recovering the color burst signals to supply reference signals; Seventh, means for locking an output of the local source and the recovered color burst reference signals in frequency and in a desired phase relationship; Eighth, means for applying an output of the local source to said color grid elements to switch the same; and Ninth, modulating means intercoupling said local source and a beam-intensity modulating electrode of such picture tube in such a manner as to provide at such electrode modulations including at least a low-order harmonic of the output frequency of said local source.

3. In a color television receiver for receiving standard modulated composite color television waves including video signals consisting of luminance components and color subcarrier components representative of hues and saturations, and also including horizontal and vertical synchronizing signal components and color burst signal components, the combination of: First, a cathode ray picture tube having at least one beam-intensity modulating electrode adapted to have video signals applied thereto, horizontal and vertical beam-deflecting electrodes adapted to have deflecting signals applied thereto, a display screen against which electrons from said gun are directed and comprising a base having disposed thereon horizontal strips of phosphors respectively emissive of light of different primary colors additive to produce white light, said strips being disposed in a cyclically repeating pattern of groups emissive of light of all of said colors, and color grid elements adapted to have color switching signals applied thereto; Second, a source of such composite color television waves; Third, means coupling said source of composite color television waves to a beam-intensity modulating electrode of said tube; Fourth, means for recovering and converting the horizontal and vertical signal components into deflecting signals and applying the same to their respective sets of beam-deflecting electrodes; Fifth, a color subcarrier regenerator; Sixth, means controlled by the horizontal synchronizing components for recovering the color burst signals to supply reference signals; Seventh, means for locking an output of the color subcarrier regenerator and the recovered color burst reference signals in frequency and in a desired phase relationship; Eighth, means for applying an output of the color subcarrier regenerator to said color grid elements to switch the same; and Ninth, modulating means intercoupling said regenerator and a beam-intensity modulating electrode of such picture tube in such a manner as to provide at such electrode modulations including the fundamental and third harmonic of the output frequency of said color subcarrier regenerator.

4. In a color television receiver for receiving standard modulated composite color television waves including video signals consisting of luminance components and color subcarrier components representative of hues and saturations, and also including horizontal and vertical synchronizing signal components and color burst signal components, the combination of: First, a cathode ray picture tube having at least one beam-intensity modulating electrode adapted to have video signals applied thereto, horizontal and vertical beam-deflecting electrodes adapted to have deflecting signals applied thereto, a display screen against which electrons from said gun are directed and comprising a base having disposed thereon horizontal strips of phosphors respectively emissive of light of different primary colors additive to produce white light, said strips being disposed in a cyclically repeating pattern of groups emissive of light of all of said colors, and color grid elements adapted to have color switching signals applied thereto; Second, a source of such composite color television waves; Third, means coupling said source of composite color television waves to a beam-intensity modulating electrode of said tube; Fourth, means for recovering and converting the horizontal and vertical signal components into deflecting signals and applying the same to their respective sets of beam-deflecting electrodes; Fifth, a color subcarrier regenerator; Sixth, means controlled by the horizontal synchronizing components for recovering the color burst signals to supply reference signals; Seventh, means for locking an output of the color subcarrier regenerator and the recovered color burst reference signals in frequency and in a desired phase relationship; Eighth, means for applying an output of the regenerator to said color grid elements to switch the same; and Ninth, modulating means intercoupling said regenerator and a beam intensity modulating electrode of such picture tube in such a manner as to provide at such electrode modulations including at least the fundamental and a low-order harmonic of the output frequency of said color subcarrier regenerator.

5. In a color television receiver for receiving standard modulated composite color television waves including video signals consisting of luminance components and color subcarrier components representative of hues and saturations, and also including horizontal and vertical synchronizing signal components and color burst signal components, the combination of: First, a cathode ray picture tube having a pair of beam-intensity modulating electrodes, one of which is adapted to have video signals applied thereto, horizontal and vertical beam-deflecting electrodes adapted to have deflecting signals applied thereto, strips of phosphors respectively emissive of light of different primary colors additive to produce white light, and color grid elements adapted to have color switching signals applied thereto; Second, a source of such composite color television waves; Third, means coupling said source of composite color television waves to said one beam-intensity modulating electrode of said tube; Fourth, means for recovering and converting the horizontal and vertical signal components into deflecting signals and applying the same to their respective sets of beam-deflecting electrodes; Fifth, a color subcarrier regenerator; Sixth, means controlled by the horizontal synchronizing components for recovering the color burst signals to supply reference signals; Seventh, means for locking an output of the color subcarrier regenerator and the recovered color burst reference signals in frequency and in a desired phase relationship; Eighth, means for applying an output of the color subcarrier regenerator to said color grid elements to switch the same; and Ninth, modulating means intercoupling said regenerator and the other beam-intensity modulating electrode of such picture tube in such a manner as to provide at such electrode modulations including at least the third harmonic of the output frequency of said color subcarrier regenerator.

6. In a color television receiver for receiving standard modulated composite color television waves including video signals consisting of luminance components and color subcarrier components representative of hues and saturations, and also including horizontal and vertical synchronizing signal components and color burst signal components, the combination of: First, a cathode ray picture tube having a pair of beam-intensity modulating electrodes, one of which is adapted to have video signals applied thereto, horizontal and vertical beam-deflecting electrodes adapted to have deflecting signals applied thereto, strips of phosphors respectively emissive of light of different primary colors additive to produce white light, and color grid elements adapted to have color switching signals applied thereto; Second, a source of such composite color television waves; Third, means coupling said source of composite color television waves to said one beam-intensity modulating electrode of said tube; Fourth, means for recovering and converting the horizontal and vertical signal components into deflecting signals and applying the same to their respective sets of beam-deflecting electrodes; Fifth, a color subcarrier regenerator; Sixth, means controlled by the horizontal synchronizing components for recovering the color burst signals to supply reference signals; Seventh, means for locking an output of the color subcarrier regenerator and the recovered color burst reference signals in frequency and in a desired phase relationship; Eighth, switch-circuit means for applying an output of the color subcarrier regenerator to said color grid elements to switch the same; and Ninth, modulating means intercoupling said regenerator and the other beam-intensity modulating electrode of such tube in such a manner as to provide at such electrode modulations including the fundamental and third harmonic of the output frequency of said color subcarrier regenerator, said molulating means comprising a transformer having its primary connected to the switch-circuit means, together with a pair of secondaries, an implifier coupled between one of said secondaries and such other electrode, and a third-harmonic frequency multiplier coupled between the other of said secondaries and such other electrode.

References Cited in the file of this patent

UNITED STATES PATENTS

| | | |
|---|---|---|
| 2,532,511 | Okolicsanyi | Dec. 5, 1950 |
| 2,606,246 | Sziklai | Aug. 5, 1952 |
| 2,617,876 | Rose | Nov. 11, 1952 |
| 2,657,257 | Lesti | Oct. 27, 1953 |
| 2,669,675 | Lawrence | Feb. 16, 1954 |
| 2,680,147 | Rhodes | June 1, 1954 |
| 2,681,381 | Creamer | June 15, 1954 |
| 2,697,744 | Richman | Dec. 21, 1954 |
| 2,705,257 | Lawrence | Mar. 29, 1955 |